United States Patent [19]

Bello

[11] 4,349,912
[45] Sep. 14, 1982

[54] ELECTRODE POSITIONING CONTROL

[75] Inventor: James R. Bello, Pittsburgh, Pa.

[73] Assignee: Lectromelt Corporation, Pittsburgh, Pa.

[21] Appl. No.: 249,096

[22] Filed: Mar. 30, 1981

[51] Int. Cl.$^3$ .......................................... H05B 7/152
[52] U.S. Cl. .................................................. 373/105
[58] Field of Search ............................................ 13/13

[56] References Cited

U.S. PATENT DOCUMENTS 4,194,078  3/1980  Thomas .............................. 13/13 X

*Primary Examiner*—Roy N. Envall, Jr.
*Attorney, Agent, or Firm*—Fred Wiviott

[57] ABSTRACT

An electrode positioning control for electric arc furnaces includes a first circuit for producing an electric error signal functionally related in magnitude and sense to the electrical parameters in the electrode. The error signal is used to control the firing angle of an electronic switching device coupled between an electrode positioning motor and its power source. In addition, a signal generator is coupled to the motor for providing a velocity feedback signal functionally related to motor speed and direction for further modulating the firing angle.

13 Claims, 1 Drawing Figure

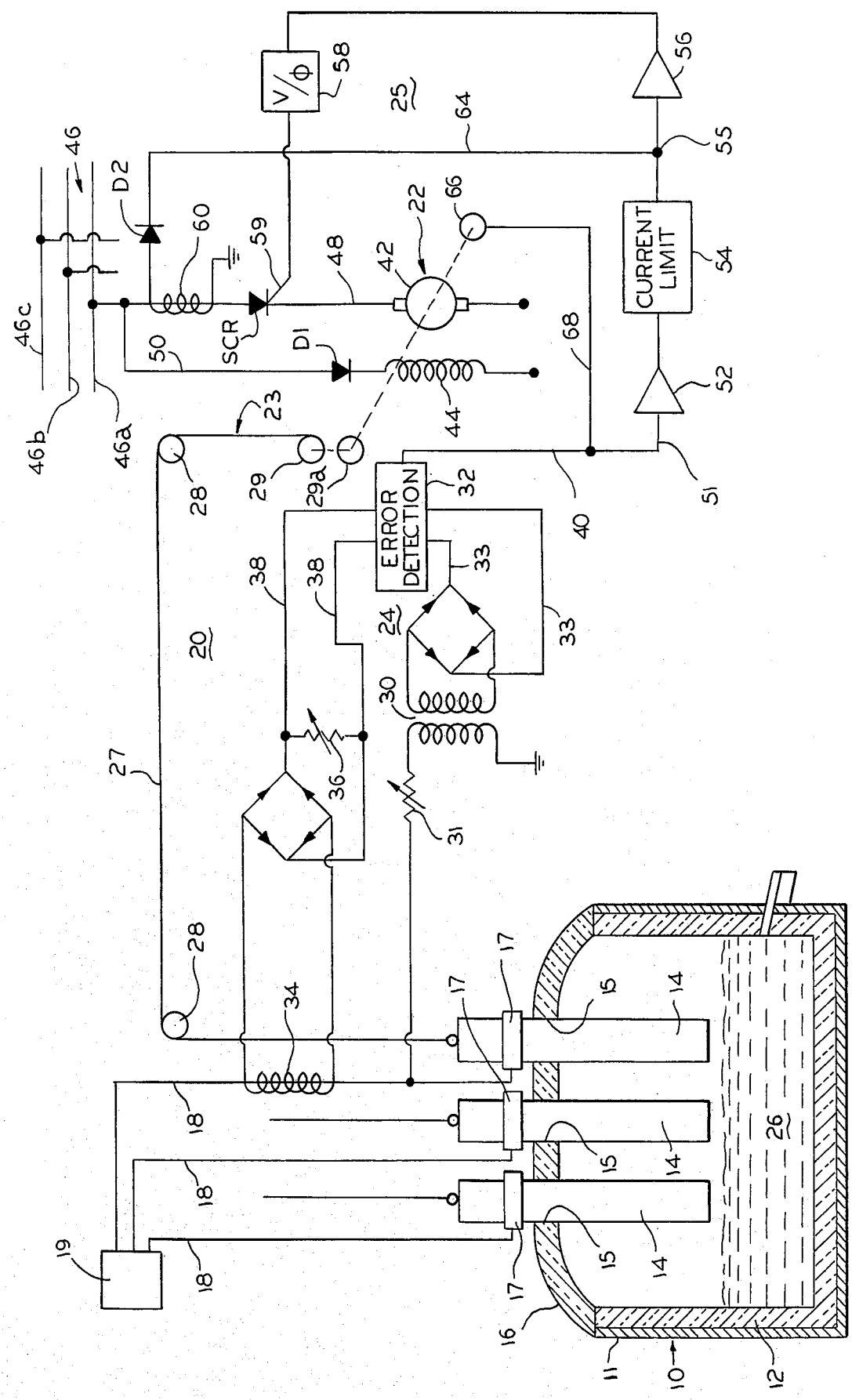

ELECTRODE POSITIONING CONTROL

BACKGROUND OF THE INVENTION

This invention relates to electric arc furnaces and more particularly to controls for positioning arc furnace electrodes.

Electric arc furnaces are commonly employed for melting or treating metallic furnace charges. The heat required for such fusion or treatment is provided by the $I^2R$ losses incident to arcs or electric current passing between the furnace electrodes or between the electrodes and the contents of the furnace. It will be appreciated that the position of the electrodes, relative to the furnace charge affects the voltage and current parameters. As a result, arc furnace electrodes must be maintained at a preselected position relative to the melt in order to maintain furnace electrical conditions within desired limits. One type of system for controlling electrode position employs an electric motor driven drum which is coupled to the electrode by a wire rope or cable. A control system is coupled to the motor and to the electrode for continuously adjusting the electrode position in accordance with the magnitude of electrode current and voltage.

SUMMARY OF THE INVENTION

It is an object of the invention to provide a new and improved electrode positioning assembly for electric arc furnaces.

A further object of the invention is to provide electric arc furnace electrode positioning controls which are simple and economical.

Yet another object of the invention is to provide an electrode positioning control which positions arc furnace electrodes accurately and smoothly.

These and other objects and advantages of the present invention will become more apparent from the detailed description thereof taken with the accompanying drawings.

In general terms, however, the invention comprises an electric arc furnace positioning control having first circuit means for producing an error signal functionally related in magnitude and sense to the electrical parameters in the electrode and second circuit means responsive to the error signal for controlling the magnitude of electrical energy provided to electrode positioning motor means. In addition, means may be provided for generating a second signal functionally related to electrode translational speed for modulating the error signal to control motor positioning velocity.

BRIEF DESCRIPTION OF THE DRAWING

The single FIGURE of the drawing schematically illustrates an electrode positioning control in accordance with the preferred embodiment of the invention.

DESCRIPTION OF THE PREFERRED EMBODIMENT

The single FIGURE of the drawing schematically illustrates an electric arc furnace 10 to which the control system of the present invention is applicable. In general terms, the furnace 10 includes a metallic shell 11 and a refractory lining 12. A plurality of electrodes 14 extend through suitable openings 15 in the arched roof 16 of furnace 10. The electrodes 14 may be of any conventional type, such as carbons and in the illustrated embodiment, three electrodes are shown. Each of the electrodes 14 includes a clamp 17 connected by a phase conductor 18 to one phase of a three-phase electrical power supply system symbolized by a transformer 19. Those skilled in the art will appreciate that each clamp 17 will include conductive members supported for pressure engagement with the electrode surface whereby electric current may be transferred readily therebetween.

Each electrode 14 is supported for vertical movement relative to the furnace 10 in any suitable manner such as by means of a schematically illustrated positioning mechanism 20 which includes a positioning motor 22 and a cable assembly 23. As will be discussed more fully below, a first control mechanism 24 is operative to sense electrode current and voltage and to provide an error signal to a motor control circuit 25. The motor 22 is respective to control signals from circuit 25 for driving the cable assembly 23 so that its associated electrode 14 is adjusted vertically. In this manner, each electrode 14 is positioned at the desired distance from the molten bath 26 within furnace 10. While only a single motor 22, cable mechanism 23 controls 24 and 25 are shown to be connected to one of the electrodes 14, it will be appreciated that there will be an identical control system for each of the other electrodes 14 as well.

The cable mechanism 23 includes a cable 27 coupled at one end to its associated electrode 14 and extending therefrom over sheaves 28. The opposite end of cable 27 is connected to a drum 29 which is driven by motor 22 through a gear reducing mechanism 29a.

The first control circuit 24 is coupled to its associated conductor 18 for receiving a first signal functionally related to electrode voltage and a second signal functionally related to electrode current. Those skilled in the art will appreciate that electrode current will be inversely related to the distance between the electrode 14 and the bath 26 while electrode voltage will be directly related. Accordingly, control 24 includes an isolation transformer 30 whose primary is connected to conductor 18 through a resistor 31 so that a signal appears across the secondary of transformer 30 which is functionally related to the potential between electrode 14 and bath 25. This signal is rectified and provided to an error detection circuit 32 through conductors 33. Also coupled to conductor 18 is a current transformer 34 which generates a current signal functionally related to electrode current. This signal is rectified and applied across resistor 36 so that a voltage signal functionally related to electrode current is applied to error detection circuit 32 through conductors 38. Error detection circuit 32 is operative to compare the voltage signals delivered through conductors 33 and 38 and to provide an error signal to the motor control circuit 25 which will vary in magnitude and sense depending upon the deviation of the input signals from preselected values.

Should the gap between electrode 14 and the furnace bath 26 from a desired value, electrode voltage will increase and electrode current will decrease and there will be a corresponding change in the signals at conductors 33 and 38. Error detection circuit 32 will sense these signals and provide an output errir signal at conductor 40 such that motor 22 will operate to elevate the electrodes in a manner which will be discussed in greater detail below. The electrode will continue to be raised until the voltage and current levels return to desired values. Conversely, should the electrode 14 move closer to the bath 26 than desired, the electrode current will increase and electrode voltage will decrease from preselected values. These parameter changes will again be sensed by error detection circuit 32 which will signal motor 22 to raise electrode 14 until it is again moved to its equilibrium position.

The motor 22 is of the shunt wound or permanent magnet type having an armature 42 and a shunt field winding 44. Armature 42 is connected to one phase 46a of a three-phase circuit 46 by a conductor 48 and the anode-cathode circuit of an electric energy flow control device, a silicon controlled rectifier SCR. The field winding 44 of motor 22 is also connected to phase 46a by conductor 50 and a diode D1.

Coupled to the output conductor 40 of the error detection circuit 32 is the input 51 of a current amplifier 52. A current limiting circuit 54 is connected between the output terminal of current amplifier 52 and the input terminal 55 of a second current amplifier 56. In addition, a phase angle control circuit 58 connects the output terminal of amplifier 56 to the gate 59 of the SCR. The phase angle control circuit 58 is operative to provide a voltage signal functionally related in magnitude and phase angle to the current flowing from amplifier 56. A current transformer 60 is coupled to conductor 46 and one end is connected to the input terminal 55 of amplifier 56 by a diode D2 and conductor 64. It will be appreciated that a current signal will appear at input terminal 55 which is functionally related to the current flowing in conductor 48. Also, a small generator 66 may be mechanically coupled to the motor 22 and its output terminal is connected by conductor 68 to the input terminal of current amplifier 52.

An identical motor 22 and control circuit 25 will be connected to each of the other phases 46b and 46c of the three-phase supply for positioning one of the other electrodes.

It can be seen that the current flowing to the input terminal 51 of amplifier 52 will be the sum of the output current signal from error detection circuit 32 and the output from generator 66. Error detection circuit 32 is adjusted and arranged such that a positive current will be provided to conductor 40 when the lower end of electrode 14 is too close to furnace bath 26 such that an electrode elevating operation is required. The magnitude of this current signal will be functionally related to the magnitude of over-current resulting from the degree of proximity of electrode 14 and bath 26. Conversely, a negative current signal will be provided to conductor 40 when the distance between the lower end of electrode 14 and bath 26 exceeds some maximum desired value. The magnitude of this negative current signal will also be functionally related to the electrode gap. Finally, when electrode 14 is within the desired proximity to bath 26, a predetermined small positive current signal will be provided to conductor 40.

The current provided by generator 66 to the input terminal 51 of amplifier 52 will be functionally related to the speed and rotational velocity of armature 42. Thus, when armature 42 is being rotated in a forward direction such that the electrode is being elevated, a positive current will be provided to conductor 68. On the other hand, when the motor armature 42 is rotating in an opposite direction wherein the electrode 14 is being lowered, a negative current signal will appear on conductor 68. When armature 42 is at rest, a generator 66 will likewise be at rest and zero current will be flowing in conductor 68. Instead of a generator 66, an armature velocity signal can be generated by measuring the EMF voltage across armature 22 which will be functionally related to armature rotational speed and direction.

It will be appreciated, that the current appearing in terminal 55 will be the sum of the amplified current signals provided to the input terminal 51 of amplifier 52 from conductors 40 and 68 plus one-half of the current wave flowing in phase conductor 46a. The sum of these current signals will be amplified by amplifier 56 and provided to the phase controller 58 which will generate a proportional gate signal to the gate of the SCR. When this gate signal exceeds the firing potential of the SCR, current will flow to the motor 22.

Let it be assumed that the gap between electrode 14 and the furnace charge 26 is within the desired limits so that a small positive error current signal will be provided at conductor 40. However, since the rotor 42 will be at rest, no current will be flowing in conductor 68. This relatively small current added to the half wave rectified current provided by current transformer 60 and diode D2 will be amplified by amplifier 56. Phase controller 58 will be adjusted to provide a constantly varying voltage signal functionally related to the output signal from amplifier 56 such that the SCR will be turned on for a short period during each half wave of the phase current in conductor 46. The duration of the on cycle of the SCR will be sufficient to energize rotor 42 sufficiently to just sustain the weight of the electrode 14. In this manner, the electrode will remain at rest.

Should the gap between the lower end of electrode 14 and the furnace charge 26 decrease from a preselected value, the electrode current will increase and electrode voltage will decrease. As a result, a positive signal of greater amplitude will be provided to conductor 40. This will increase the magnitude of the current provided to the phase controller 58 so that the phase angle of the signal provided to the gate of the SCR will increase providing increased current flow to armature 42 of motor 22 which will begin rising the electrode 14. This will also actuate the velocity feedback generator 66 providing a velocity feedback current signal in conductor 68 which is negative and opposed to that in conductor 40. The velocity feedback signal will regulate the elevational speed of electrode 14. As the electrode is elevated, electrode current will begin decreasing and electrode voltage will begin increasing so that the magnitude of the feedback signal in conductor 40 will begin to diminish whereby the phase angle of conduction of the SCR will also decrease until the energy flowing to the armature 42 is again just sufficient to sustain the electrode which will then come to rest as the voltage and current conditions in the electrode again reach preselected values.

Should the gap between the lower end of electrode 14 and the bath 26 become too great, such as when the electrode wears away or breaks, electrode voltage will increase and electrode current will decrease. As a result, a negative error signal will appear in conductor 40 thereby further decreasing the phase angle of the SCR. As a result, insufficient current will flow to the rotor 42 so that the electrode 14 will begin to move toward the bath 26. As the rotor 42 rotates in the reverse direction, a positive velocity feedback signal will appear in conductor 68 to control the downward velocity of the electrode. As the electrode 14 approaches the bath 26, electrode current will increase and electrode voltage will decrease so that the magnitude of the negative feedback signal in conductor 40 will begin to fall. This will continue until optimum electrode conditions are again achieved in which case feedback signal 40 will become slightly positive and the phase angle of the signal on the base of the SCR will be sufficient to maintain the system in an equilibrium condition.

While only a single embodiment of the invention has been illustrated and described, it is not intended to be limited thereby but only by the scope of the appended claims.

I claim:

1. An electric arc furnace having at lease one electrode,
   drive means for positioning said electrode relative to a furnace charge,
   an energy source coupled to said drive means for operating the same,
   error detection circuit means coupled to said electrode for generating an error signal functionally related to the magnitude of electrode current,
   electrical energy flow control means coupled to said energy source and said drive means, controller means coupled to said error detection circuit means and to flow control means, said controller means being responsive to said error signal for controlling the flow of electrical energy through said flow control means to said drive means whereby said electrode will be positioned relative to said furnace charge in accordance with electrical conditions in said electrode.

2. The electric arc furnace set forth in claim 1 including velocity signal generating means coupled to said drive means for generating a velocity signal functionally related to the travel velocity of said electrode, said velocity signal generating means also being coupled to said controller means to apply said velocity signal in an algebraically additive sense to said error signal whereby the flow of electrical energy to said drive means is related to the velocity thereof.

3. The electric furnace set forth in claims 1 or 2 wherein said drive means includes a shunt wound DC motor having a rotor, said flow control means controlling the flow of electrical energy to said rotor.

4. The arc furnace set forth in claim 3 wherein said electrical energy flow control means comprises directional switching circuit means having gate means and operative to conduct electrical energy in accordance with the magnitude and phase angle of an applied gate signal, said controller means comprising phase control means coupled to said error detection circuit means and said gate means and responsive to said error signal for providing a gate signal having a phase angle functionally related to the magnitude of said error signal.

5. The electric arc furnace set forth in claim 4 wherein said directional switching means comprises a controlled rectifier.

6. The electric arc furnace set forth in claim 5 and including electrical current measuring means connected to said energy source for generating a current signal functionally related to the magnitude of the current flow to said drive means and coupled to said directional switching circuit means in an additive sense relative to said error signal whereby said gate signal phase angle will be related to the algebraic sum of said error signal, said velocity signal and said current signal.

7. An electric arc furnace having at least one electrode,
   drive means for positioning said electrode relative to a furnace charge,
   an energy source coupled to said drive means for operating the same, said drive means being operative to raise said electrode when the magnitude of electrical energy received exceeds a predetermined value and is incapable of sustaining said electrode when the magnitude of said energy is less than a predetermined value whereby the electrode moves toward the furnace charge,
   error detection circuit means coupled to said electrode for generating an error signal functionally related in magnitude and sense to the deviations of the current and voltage in said electrode from preselected values,
   electrical energy flow control means coupled to said energy source and to said drive means, controller means coupled to said error detection circuit means and to said energy flow control means, said controller means being responsive to said error signal to control the energy delivered to said drive means in relation to the magnitude and sense of said error signal, whereby said drive means will be energized sufficiently to sustain said electrode relative to said furnace charge when said error signal is equal to a predetermined value, said energization being sufficient to elevate said electrode when said error signal deviates from said value in a first sense and said energization being insufficient to sustain said electrode when said error signal deviates from said value in a second sense.

8. The electric arc furnace set forth in claim 7 including velocity signal generating means coupled to said drive means for generating a velocity signal functionally related to the travel velocity of said electrode, said velocity feedback signal generating means also being coupled to said controller means for modulating said error signal in accordance with electrode travel velocity.

9. The electric arc furnace set forth in claims 7 or 8 wherein the magnitude of the energy flowing to said drive means is directly related to the deviation of said error signal from said predetermined value.

10. The electric furnace set forth in claim 9 wherein said drive means includes a shunt wound DC having a rotor, said electrical energy flow control means controlling the flow of electrical energy to said rotor.

11. The arc furnace set forth in claim 10 wherein said electrical energy flow control means comprises directional switching circuit means having a gate and being operative to conduct electrical energy in accordance with the magnitude and phase angle of an applied gate signal, said controller means being responsive to said error signal for providing a gate signal having a phase angle functionally related to the magnitude of said error signal.

12. The electric arc furnace set forth in claim 11 wherein said switching circuit means comprises a controlled rectifier.

13. The electric arc furnace set forth in claim 12 and including electrical current measuring means connected to said energy source for generating a current signal functionally related to the energization of said rotor and coupled to said switching circuit means in an additive sense relative to said error signal whereby said gate signal phase angle will be related to the algebraic sum of said error signal, said velocity signal and said current signal.

* * * * *

UNITED STATES PATENT AND TRADEMARK OFFICE
CERTIFICATE OF CORRECTION

PATENT NO. : 4,349,912
DATED : September 14, 1982
INVENTOR(S) : James R. Bello

It is certified that error appears in the above–identified patent and that said Letters Patent are hereby corrected as shown below:

Claim 5, line 2, after "switching" insert --circuit--.

Claim 10, line 2, after "DC" insert --motor--.

Signed and Sealed this

Tenth Day of May 1983

[SEAL]

Attest:

GERALD J. MOSSINGHOFF

*Attesting Officer*   *Commissioner of Patents and Trademarks*